(12) United States Patent
Xin et al.

(10) Patent No.: US 12,468,879 B2
(45) Date of Patent: Nov. 11, 2025

(54) METHOD, APPARATUS AND ELECTRONIC DEVICE FOR FIELD MERGING

(71) Applicant: Beijing Zitiao Network Technology Co., Ltd., Beijing (CN)

(72) Inventors: Hongxiao Xin, Beijing (CN); Siteng Li, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/542,288

(22) Filed: Dec. 15, 2023

(65) Prior Publication Data

US 2024/0119223 A1    Apr. 11, 2024

Related U.S. Application Data

(63) Continuation of application No. PCT/CN2023/080567, filed on Mar. 9, 2023.

(30) Foreign Application Priority Data

Mar. 11, 2022  (CN) .......................... 202210243981.7

(51) Int. Cl.
*G06F 40/174* (2020.01)
*G06F 40/177* (2020.01)

(52) U.S. Cl.
CPC .......... *G06F 40/174* (2020.01); *G06F 40/177* (2020.01)

(58) Field of Classification Search
None
See application file for complete search history.

(56) References Cited

U.S. PATENT DOCUMENTS

| 9,715,487 B2* | 7/2017 | Rapp ..................... G06F 40/258 |
| 2001/0049699 A1* | 12/2001 | Pratley .................. G06F 40/177 |
| | | 715/212 |
| 2002/0116417 A1* | 8/2002 | Weinberg ............... G06F 16/30 |
| | | 707/E17.058 |

(Continued)

FOREIGN PATENT DOCUMENTS

| CN | 101388028 A | 3/2009 |
| CN | 108351867 A | 7/2018 |

(Continued)

OTHER PUBLICATIONS

International Search Report in PCT/CN2023/080567, mailed May 23, 2023, 5 pages.

(Continued)

*Primary Examiner* — Irete F Ehichioya
(74) *Attorney, Agent, or Firm* — Astute IP Law Group

(57) ABSTRACT

The embodiments of the application disclose a method, an apparatus and an electronic device for field merging. A detailed implementation of the method includes: in response to receiving a merging request for data columns in a table, presenting a field selection page containing header row fields of the data columns; determining at least two target header row fields from the header row fields on the field selection page; and in response to receiving a merging instruction, generating a merged field in a header row of the table and generating merged data in a data column corresponding to the merged field.

20 Claims, 7 Drawing Sheets

(56) References Cited

U.S. PATENT DOCUMENTS

| | | | |
|---|---|---|---|
| 2017/0052984 A1 | 2/2017 | Treiser | |
| 2017/0124052 A1* | 5/2017 | Campbell | ............... G06N 20/00 |
| 2017/0124055 A1* | 5/2017 | Radakovitz | ........... G06F 3/0488 |
| 2017/0126772 A1* | 5/2017 | Campbell | ................ H04L 65/70 |
| 2017/0329749 A1* | 11/2017 | Milward | ............... G06F 40/166 |
| 2022/0366129 A1* | 11/2022 | Dong | .................... G06F 40/137 |

FOREIGN PATENT DOCUMENTS

| | | |
|---|---|---|
| CN | 110333853 A | 10/2019 |
| CN | 112632939 A | 4/2021 |
| CN | 113688617 A | 11/2021 |
| CN | 113885770 A | 1/2022 |
| CN | 114048718 A | 2/2022 |
| CN | 114707472 A | 7/2022 |

OTHER PUBLICATIONS

"Cubes in practice: Stitching fields or text", Feishu Help Center, Available online at: <https://www.rwork.crc.com.cn/hc/zh-CN/articles/61911718>, Dec. 24, 2020, 2 pages.

"How do I use the card view on the mobile side of the table?", Flight Book Help Center, Available online at: <https://www.fs.huaqin.com/hc/zh-cn/articles/813094348964-Card view of how the table mobile is used>, Dec. 24, 2020, 4 pages.

Office Action for Chinese Patent Application No. 202210243981.7, mailed on Aug. 7, 2024, 19 pages.

Office Action for Chinese Patent Application No. 202210243981.7, mailed on Mar. 26, 2025, 20 pages.

\* cited by examiner

| ORDER NO. | NAME | GENDER | RESIDENTIAL ADDRESS | TEL. |
|---|---|---|---|---|
| 111 | SAN ZHANG | MALE | NO. XX, A STREET, HAIDIAN DISTRICT, BEIJING | 11111 |
| 112 | SI LI | MALE | NO. XX, B STREET, HAIDIAN DISTRICT, BEIJING | 22222 |
| 113 | WU ZHAO | MALE | NO. XX, C ROAD, CHAOYANG DISTRICT, BEIJING | 33333 |
| 114 | LIU WANG | FEMALE | NO. XX, C ROAD, CHANGPIN DISTRICT, BEIJING | 44444 |

701

| ORDER NO. | USER INFORMATION | TEL. |
|---|---|---|
| 111 | ... | 11111 |
| 112 | ... | 22222 |
| 113 | ... | 33333 |
| 114 | ... | 44444 |

702

| ORDER NO. | USER INFORMATION | TEL. |
|---|---|---|
| 111 |  | 11111 |
| 112 | | |
| 113 | | |
| 114 | | |

702

703

NAME: SAN ZHANG
GENDER: MALE
RESIDENTIAL ADDRESS: NO. XX, A STREET, HAIDIAN DISTRICT, BEIJING

METHOD, APPARATUS AND ELECTRONIC DEVICE FOR FIELD MERGING

CROSS-REFERENCE OF RELATED APPLICATIONS

This application is a continuation of International Patent Application No. PCT/CN2023/080567, filed on Mar. 9, 2023, which claims priority to Chinese Patent Application No. 202210243981.7, filed on Mar. 11, 2022, both of which are incorporated herein by reference in their entireties.

FIELD

The embodiments of the present disclosure relate to the technical field of computer, particularly to a method, an apparatus and an electronic device of field merging.

BACKGROUND

In some scenarios, users may need to create multiple field records. A record may contain multiple types of information, and each type of information may also include multiple fields. Usually, each row in a data table is called a "record", and each record contains all the information in this row, just like all the information of a person in an address book database. However, the record has no specific record name in the database, and it is often represented by the number of rows it is in. A field is a smaller unit than a record, and a collection of fields constitutes a record. Each field describes a certain feature and has a unique field identifier recognized by the computer.

SUMMARY

This summary is provided to briefly introduce concepts, which will be described in detail in the following detailed description. This summary is not intended to identify key features or necessary features of the claimed technical solution, nor is it intended to limit the scope of the claimed technical solution.

The embodiments of the present disclosure provide a method, an apparatus and an electronic device of field merging, making the data structure in the table clearer, and improving the user's reading efficiency for the table.

In a first aspect, the embodiments of the present disclosure provide a method of field merging, comprising: in response to receiving a merging request for data columns in a table, presenting a field selection page containing header row fields of the data columns; determining at least two target header row fields from the header row fields on the field selection page; and in response to receiving a merging instruction, generating a merged field in a header row of the table and generating merged data in a data column corresponding to the merged field.

In a second aspect, the embodiments of the present disclosure provide an apparatus for field merging, comprising: a presentation unit for in response to receiving a merging request for data columns in a table, presenting a field selection page containing header row fields of the data columns; a determination unit for determining at least two target header row fields from the header row fields on the field selection page; and a generation unit for in response to receiving a merging instruction, generating a merged field in a header row of the table and generating merged data in a data column corresponding to the merged field. In a third aspect, the embodiments of the present disclosure provide an electronic apparatus, comprising: one or more processors; a storage apparatus having one or more programs stored thereon; when the one or more programs are performed by the one or more processors, causing the one or more processors to implement the method of field merging of the first aspect.

In a fourth aspect, the embodiments of the present disclosure provide a computer readable medium with a computer program stored thereon, wherein the program implements the method of field merging of the first aspect.

The embodiments of the present disclosure provide the method, the apparatus, and the electronic device of field merging. In response to receiving a merging request for data columns in a table, a field selection page containing header row fields of the data columns is presented. Then, at least two target header row fields are determined from the header row fields on the field selection page. In response to receiving a merging instruction, a merged field is generated in a header row of the table and merged data is generated in a data column corresponding to the merged field.

BRIEF DESCRIPTION OF THE DRAWINGS

In combination with the accompanying drawings and with reference to the following detailed description, the above and other features, advantages and aspects of various embodiments of the present disclosure will become more apparent. Throughout the drawings, the same or similar reference numerals represent the same or similar elements. It should be understood that the drawings are illustrative and that the components and elements are not necessarily drawn scale.

FIG. 7 is a schematic diagram of an application scenario according to the method of field merging of the present disclosure;

DETAILED DESCRIPTION

The embodiments of the present disclosure will be described in more detail with reference to the accompanying drawings, in which some embodiments of the present disclosure have been illustrated. However, it should be understood that the present disclosure can be implemented in various manners, and thus should not be construed to be limited to embodiments disclosed herein. On the contrary, those embodiments are provided for the thorough and complete understanding of the present disclosure. It should be understood that the drawings and embodiments of the present disclosure are only used for illustration, rather than limiting the protection scope of the present disclosure.

It should be understood that various steps described in method implementations of the present disclosure may be performed in different order and/or in parallel. Furthermore, method implementations may include additional steps and/or omit steps that are shown. The scope of the present disclosure is not limited in this regard.

The terms "comprise" and its variants used herein are to be read as open terms that mean "include, but is not limited to." The term "based on" is to be read as "based at least in part on." The term "one embodiment" is to be read as "at least one embodiment," the term "another embodiment" is to be read as "at least one another embodiment," and the term "some embodiments" is to be read as "at least some embodiments." Other definitions, explicit and implicit, might be included below.

It should be noted that concepts "first," "second" and the like mentioned in the present disclosure are only used to distinguish between different apparatuses, modules or units, rather than limiting the order or interdependence of the functions performed by these apparatuses, modules or units.

It should be noted that modifications "one" and "more" mentioned in the present disclosure are schematic and not limiting, and should be understood as "one or more" to those skilled in the art unless otherwise specified.

Names of messages or information exchanged between the plurality of apparatuses in implementations of the present disclosure are used for illustrative purposes only and are not intended to limit the scope of those messages or information.

Figure 1:
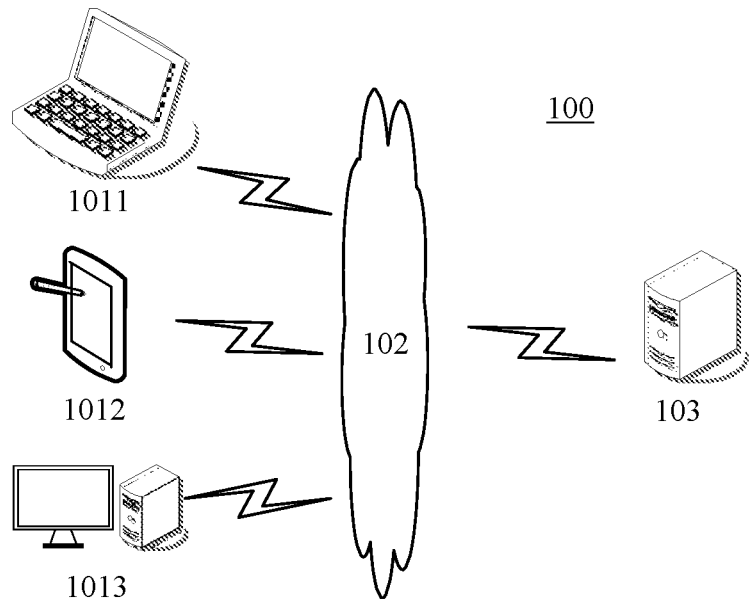
FIG. 1 is an exemplary system architecture diagram to which various embodiments of the present disclosure may be applied.

FIG. 1 illustrates an exemplary system architecture 100 which may apply the embodiments of the method of field merging of the present disclosure.

As shown in FIG. 1, the system architecture 100 may include a terminal device 1011, a terminal device 1012, a terminal device 1013, a network 102, and a server 103. The network 102 is a medium for providing a communication link between the terminal devices 1011, 1012, 1013 and the server 103. The network 102 may include various connection types, such as wired, wireless communication links, or fiber optic cables, and the like.

Users may use the terminal devices 1011, 1012, 1013 to interact with the server 103 through the network 102 to send or receive messages, etc. For example, the terminal devices 1011, 1012, 1013 may obtain table information in the table from the server 103. Various communication client applications may be installed on the terminal devices 1011, 1012, 1013, such as spreadsheet software, document applications, data dashboard applications, instant messaging software, etc.

The terminal devices 1011, 1012, 1013 in response to receiving a merging request for data columns in a table, present a field selection page containing header row fields of the above-described data columns; then, may determining at least two target header row fields from the header row fields on the above-described field selection page; in response to receiving a merging instruction, generate a merged field in a header row of the above-described table and generating merged data in a data column corresponding to the above-described merged field.

The terminal devices 1011, 1012, 1013 may be hardware or software. when the terminal devices 1011, 1012, 1013 are hardware, they may be various electronic devices with display screens and support information exchange, including but not limited to smartphones, tablets, laptops, etc. When the terminal devices 1011, 1012, 1013 are software, they may be installed in the electronic devices listed above described. They may be implemented as multiple software or software modules (such as multiple software or software modules configured to provide distributed services), or as a single software or software module. No specific limitations are made here.

The server 103 may be a server that provides various services. For example, it may be a backend server that provides table information to the terminal devices 1011, 1012, 1013.

It should be noted that server 103 may be hardware or software. When the server 103 is hardware, it may be implemented as a distributed server cluster composed of multiple servers, or as a single server. When the server 103 is software, it may be implemented as multiple software or software modules (such as configured to provide distributed services), or as a single software or software module. No specific limitations are made here.

It should also be noted that the method of field merging provided by the embodiments of the present disclosure is typically performed by the terminal devices 1011,1012, 1013, then the apparatus for field merging is typically installed in the terminal devices 1011,1012,1013.

It should also be noted that, if the terminal devices 1011,1012,1013 locally store page information of the current page, the system architecture 100 may not include the server 103 and network 102.

It should be understood that the number of terminal devices, networks, and servers in FIG. 1 is merely illustrative and may have any number of terminal devices, networks, and servers depending on implementation needs.

Figure 2:
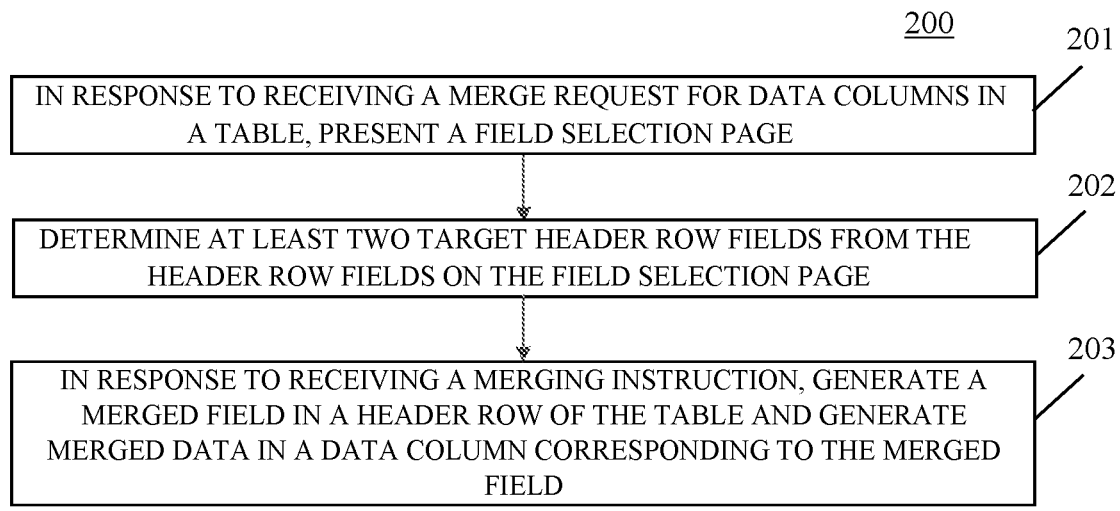
FIG. 2 is a flowchart of one embodiment according to the method of field merging of the present disclosure.

Continue to refer to FIG. 2, which illustrates a flow 200 of one embodiment of the method of field merging according to the present disclosure. The method of field merging comprises the following steps.

Step 201, in response to receiving a merging request for data columns in a table, present a field selection page.

In the embodiment of the present disclosure, an execution actor of the method of field merging (such as the terminal device shown in FIG. 1) may determine whether a merging request for data columns in a table is received. There are usually at least two data columns presented in the above-described table. A data column is a set of data collections, and each set of data collections is a data collection under a header row field. Each header row field describes a certain feature and has a unique field identifier recognized by a computer. As an example, in a vehicle information table, the header row fields such as vehicle model, color, interior, endurance, rim, and optional configuration may be included. The data columns may include multiple cells, and the data in the cells under the field "color" may include but is not limited to: red, black, white, and blue.

If a merging request is received for the data columns in the above-described table, the above-described execution actor may present the field selection page. the above-described field selection page may include header row fields of the above-described data columns.

Step 202, determine at least two target header row fields from the header row fields on the field selection page.

In the embodiment of the present disclosure, the above-described execution actor may determine at least two target header row fields from the header row fields on the above-described field selection page. Here, the user may perform a selection operation on the header row fields of the above-described field selection page. Afterwards, the above-described execution actor may determine the at least two header row fields selected by the user as the at least two target header row fields.

As an example, the above-described field selection page may present all header row fields contained in the above-described table, and a checkbox may be set before each header row field. If the user checks the checkbox in front of a certain header row field, it means that the user selects the header row field.

Step 203, in response to receiving a merging instruction, generate a merged field in a header row of the table and generate merged data in a data column corresponding to the merged field.

In the embodiment of the present disclosure, the above-described execution actor may detect whether the merging instruction has been received. The above-described merging instruction is usually configured to merge the above-described at least two target header row fields. Merging the above-described at least two target header row fields may also be understood as encapsulating the above-described at least two target header row fields as elements.

Here, the above-described field selection page may include a merge icon, if the user clicks on the above-described merge icon, the above-described execution actor may receive the merging instruction.

If the merging instruction is received, the above-described execution actor may generate the merged field in the header row of the above-described table and merged data in the data column corresponding to the above-described merged field. The above-described execution actor may add the above-described merged field to the original header row fields of the above-described table.

In some embodiments of the present disclosure, the merged data comes from the data in the data columns corresponding to the selected target header row fields. The merged data may include at least one data in the data columns corresponding to the selected target header row fields; or all data in the data columns corresponding to the selected target header row fields.

It should be noted that the addition location of the above-described merged field may be determined according to actual business needs. For example, it may be added before all target header row fields or after all target header row fields.

Figure 3:
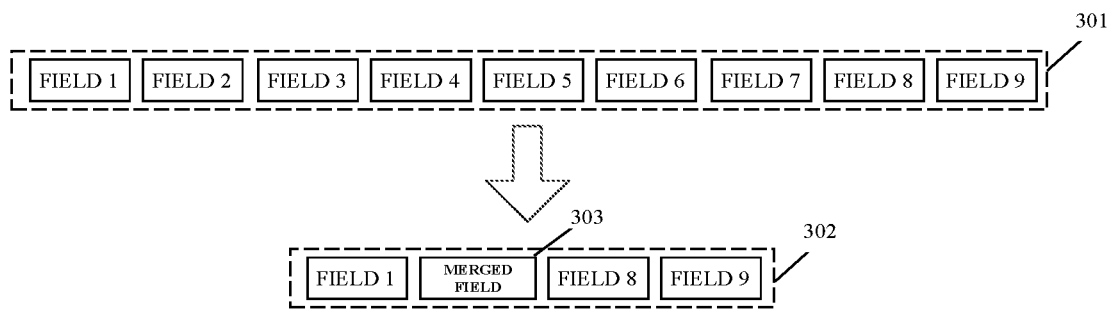
FIG. 3 is a schematic diagram before and after field replacement according to the method of field merging of the present disclosure.

As shown in FIG. 3, FIG. 3 illustrates a schematic diagram before and after field replacement according to the method of field merging of the present disclosure. In FIG. 3, an icon 301 indicates 9 fields presented in the table before field merging, specifically including fields 1 to 9. When the user merges fields 2 to 7 in the table, a merged field 303 is generated, and the fields 2 to 7 are replaced by the merged field 303 to obtain the merged table, as shown in an icon 302.

The method provided in the above-described embodiments of the present disclosure presents the field selection page in response to receiving the merging request for data columns in the table, wherein the above-described field selection page includes header row fields of the above-described data columns; then, at least two target header row fields are determined from the header row fields on the above-described field selection page; in response to receiving a merging instruction, the merged field is generated in the header row of the above-described table and the merged data is generated in the data column corresponding to the above-described merged field. In this way, the data structure in the table may be made clearer and the reading efficiency for the table may be improved.

In some optional implementations, the above-described execution actor may generate the merged field in the header row of the above-described table in the following way: the above-described execution actor may hide the above-described target header row fields, and display the above-described merged field in the cell at the associated location of the above-described target header row fields. The associated location of the above-described target header row fields may be set according to specific business situations. As an example, the associated location of the above-described target header row fields may not be set in the above-described table, for example, at the corresponding location above the above-described table. By hiding the target header row fields, the table content may be simplified and the reading efficiency for the table may be further improved.

In some optional implementations, the above-described execution actor may generate the merged data in the data column corresponding to the above-described merged field in the following way: the above-described execution actor may hide the target data columns corresponding to the above-described target header row fields, and display the above-described merged data in the data column at the associated location of the above-described target data columns. The associated location of the above-described target data column may be set according to specific business situations. As an example, the associated location of the above-described target data columns may not be set in the above-described table, for example, it may be set at the corresponding location above the above-described table. By hiding the target data columns corresponding to the target header row fields, the table content may be simplified and the user's reading efficiency for the table may be further improved.

In some optional implementations, the above-described execution actor may display a data card editing page. Here, the above-described data card editing page may include at least one of a field value, field data, field layout information, or a field style. The field layout information is configured to indicate a location of each field in a data card. By displaying the data card editing page, a method of editing data card is provided. At the same time, the data card editing page presents at least one of field values, field data, field layout information, and field styles, which may generate a more personalized data card.

In some optional implementations, the above-described execution actor may determine whether the merging instruction is received. If the merging instruction is received, the above-described execution actor may fill the determined target header row fields into the above-described field value according to a predetermined rule, and/or fill the target data in the target data columns corresponding to the above-described target header row fields into the above-described field data to generate the data card. This provides a way to generate data cards.

As an example, the above-described execution actor may fill the at least two target header row fields into the above-described field values in order from front to back according to the determined order of the at least two target header row fields, and fill the target data in the target data columns corresponding to the target header row fields into the field data corresponding to the corresponding field values. The above-described execution actor may determine the filled data card editing page as the data card.

As another example, the above-described execution actor may receive a filling instruction from the user, which may include a filling location and corresponding filling content (field values or field data), thereby fill the field values and/or field data to the corresponding the filling location (e.g., filling box).

Figure 4:
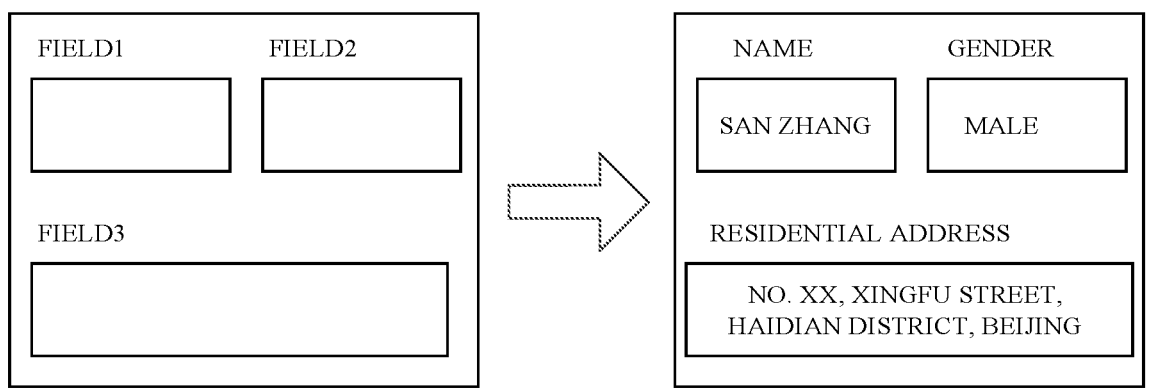
FIG. 4 is a schematic diagram of a data card editing page according to the method of field merging of the present disclosure.

As shown in FIG. 4, FIG. 4 illustrates a schematic diagram of a data card editing page according to the method of field merging of the present disclosure. The data card editing page may include multiple areas to be filled for filling field values and corresponding field data. In FIG. 4, the left figure shows the unfilled data card editing page. The user may fill the corresponding field values and field data by clicking on each data area, and the filled data card editing page is the data card, as shown in the right figure.

It should be noted that if the user is not satisfied with the layout of the filled field values and field data on the page, the location of the field values and field data may be adjusted by dragging and dropping, clicking, etc. Adjusting the location of the field values may include but are not limited to: swapping the location of the two field values, adjusting the two field values in a row to occupy a separate row of location for each field value. It should also be noted that the way to adjust the location of the field values is not limited to dragging and dropping operations and clicking operations.

In some optional implementations, the above-described execution actor may detect whether to switch the table from a first view to a second view. Here, the above-described first view may be a table after field merging, and the merged field may be presented in the table after field merging. The above-described second view may include other charts drawn using the data in the table, such as line charts, pie charts, bar charts, etc. If the above-described table is switched from the above-described first view to the above-described second view, the above-described execution actor may display the above-described merged data in form of a data card in the above-described second view. The above-described data card may be set around other charts (such as location on the left or right side of the chart). If the above-described table is switched from the above-described first view to the above-described second view, the above-described execution actor may display the above-described merged data in form of a data card in the above-described second view. By switching the table from the first view to the second view and presenting the data card of the merged data in the second view, the table data and data card may be presented in multiple view modes, making the presentation methods more diverse.

Figure 5:
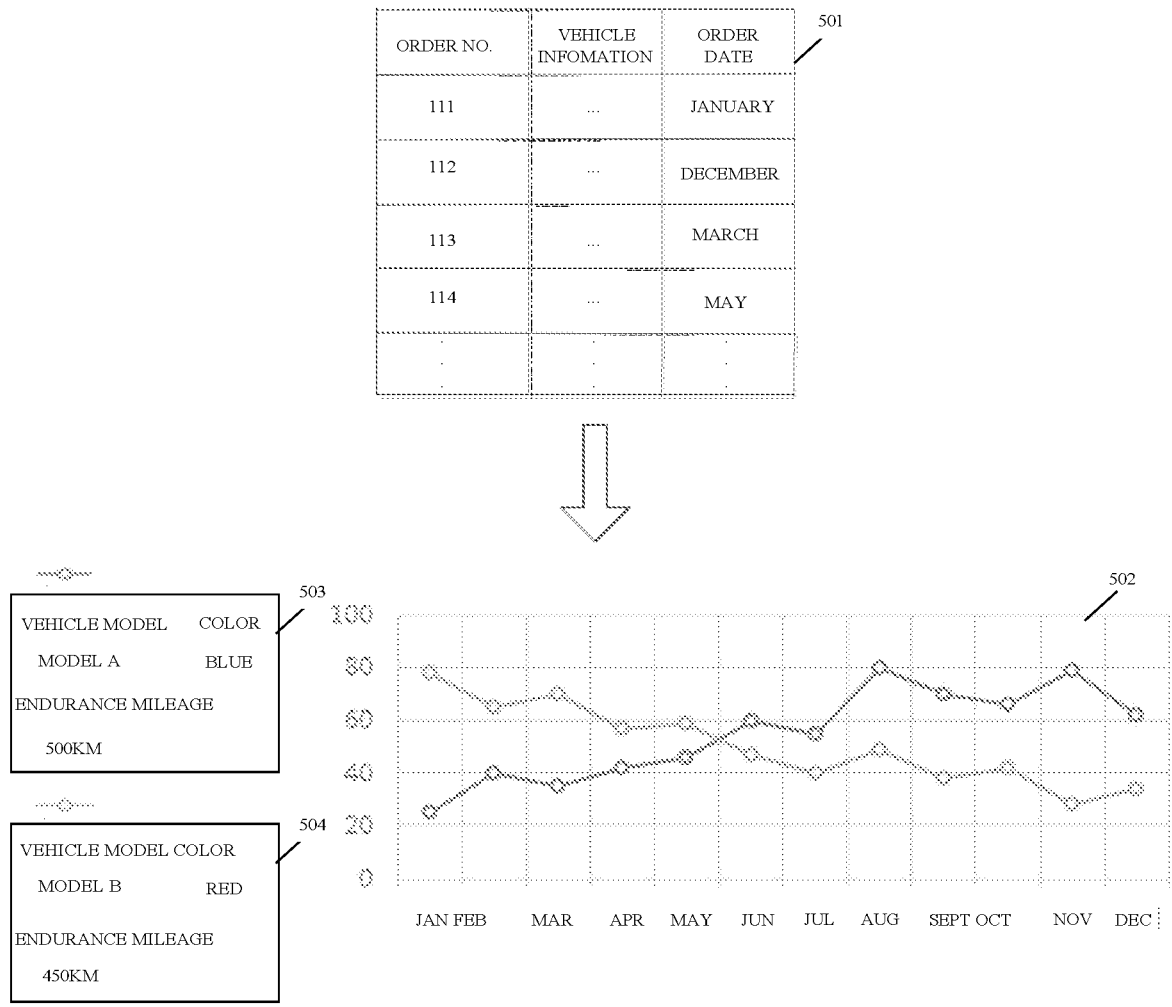
FIG. 5 is schematic diagram of a switching application scenario from a first view to a second view according to the method of field merging of the present disclosure.

As shown in FIG. 5, FIG. 5 illustrates a schematic diagram of an application scenario for switching from the first view to the second view according to the method of field merging of the present disclosure. In FIG. 5, the table after field merging is shown as an icon 501, i.e., the first view. If it is detected that the user switches from the first view to the second view, the data card of the merged data in the first view 501 may be displayed on the left side of the second view 502, as shown in icons 503 and 504. The second view shown in the icon 502 is depicted using the data in the table shown in the icon 501. The data cards shown in the icons 503 and 504 are the vehicle information of the vehicle characterized respectively by two polylines in the second view 502, that is, the merged data of the vehicle information in the first view 501.

Optionally, if the headers of other charts include multiple fields, the above-described execution actor may also merge the fields of the headers in other charts to generate the data card and present it in the corresponding location of other charts, so that users may quickly understand the relevant information of objects indicated by other charts. For example, when users view the line chart of monthly sales of vehicles, there will be a large cost of information differentiation when there are many monitoring indicators. Users usually experience the process of "looking at the title-looking at the graphic-looking at the title-looking at the graphic . . . organizing information-drawing conclusions", which requires more time and effort. Through this method of field merging, users may view the merged results and the corresponding line chart of monthly sales of vehicles. Using "merged field" to encapsulate the field values of multiple fields and present them in the form of data cards may make the structure of the data dashboard clearer. Especially in businesses where images have accurate descriptive meanings, card components with images are the most direct and effective navigation.

In some optional implementations, the above-described merged data may be displayed as link information, and content of the above-described link information may be predetermined editing content. Users may view the content of above-described link information by triggering the above-described link information. The above-described predetermined editing content may be edited according to specific business needs. Displaying the merged data as the link information provides another way to view the merged data.

In some optional implementations, a spatial range occupied by the above-described merged field in the above-described table is usually not greater than a spatial range occupied by any of the above-described target header row fields in the above-described table. Specifically, since the height of each cell in the table is usually equal, that is to say, the width of the cell where the above-described merged field is located is usually not greater than the width of the cell where any of the above-described target header row fields is located. As an example, if the width of the cell occupied by the above-described header row field is 1 cm, the width of the cell occupied by the above-described merged field usually needs to be less than 1 cm.

In some optional implementations, a spatial range occupied by a data column of the above-described merged data in the above-described table is usually not greater than a spatial range occupied by any target data column in the above-described table. The above-described target data column is usually a data column corresponding to any of the above-described target header row fields. Specifically, since the height of each cell in the table is usually equal, that is to say, the width of the cell where the data column of the above-described merged data in the above-described table is usually not greater than the width of the cell where any target data column is located. As an example, if the width of the cell where the target data column is located is 3 cm, the width of the cell where the data column of the above-described merged data is located usually needs to be less than 3 cm.

By limiting the spatial range occupied by the merged field and its corresponding data column in the table, the spatial range occupied by it may be reduced, thereby saving the view area of the table.

Figure 6:
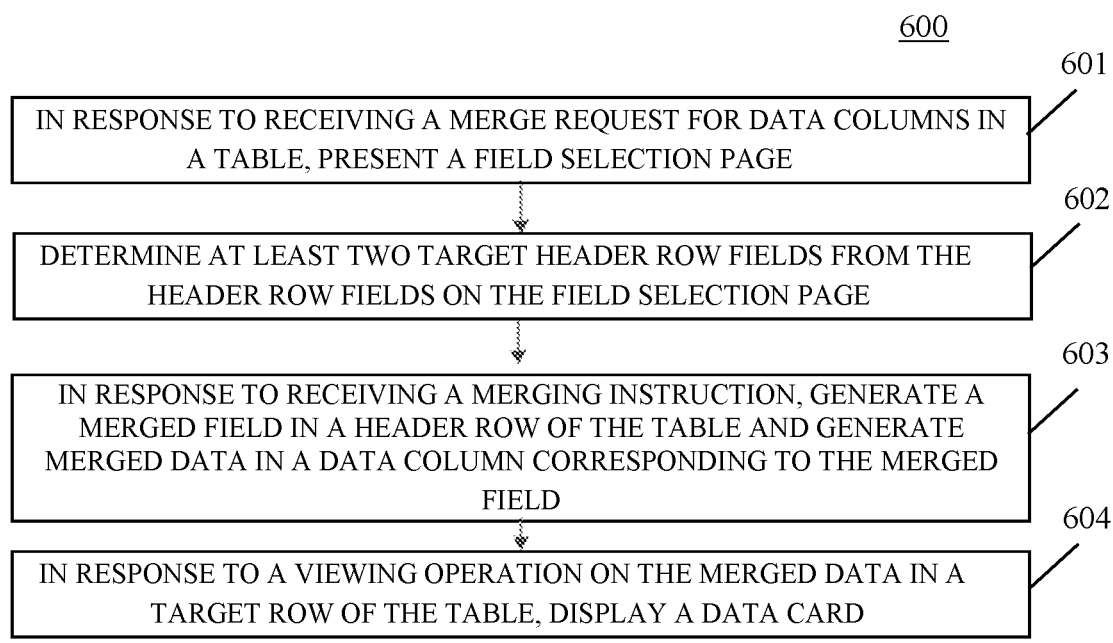
FIG. 6 is a flowchart of another embodiment according to the method of field merging of the present disclosure.

With further reference to FIG. 6, which illustrates a flow 600 of a further embodiment of the method of field merging. The flow 600 of the method of field merging comprises the following steps.

Step 601, in response to receiving a merging request for data columns in a table, present a field selection page.

Step 602, determine at least two target header row fields from the header row fields on the field selection page.

Step 603, in response to receiving a merging instruction, generate a merged field in a header row of the table and generate merged data in a data column corresponding to the merged field.

In the embodiment of the present disclosure, steps 601 to 603 may be performed in a manner similar to steps 201 to 203 and will not be repeated here.

Step 604, in response to a viewing operation on the merged data in a target row of the table, display a data card.

In the embodiment of the present disclosure, the above-described execution actor may detect whether the user is viewing the merged data in target rows of the above-described table. The above-described target rows are usually cell rows that presents the above-described merged data.

If a viewing operation is performed on the merged data in the target rows of the above-described table, the above-described execution actor may display a data card. The above-described data card may include a collection of data in all cells corresponding to the above-described target header row fields in the above-described target rows, that is, all data corresponding to at least two target header row fields determined by the user is presented on the data card. As an example, if the merged data of "San Zhang" in the above-described table is viewed, a data card including "San Zhang, male, 18 years old, Beijing" may be presented.

Here, the above-described viewing operations may include but are not limited to: mouse hovering operations, long press operations, and dragging and dropping operations.

As may be seen from FIG. 6, compared with the embodiment corresponding to FIG. 2, the flow 600 of the method of field merging in the embodiment of the present disclosure reflects the steps of presenting the data card. Therefore, the scheme described in the embodiment of the present disclosure may save the view area while retaining complete field information, improving the efficiency of information filtering and screening.

In some optional implementations, after presenting the data card, the above-described execution actor may detect whether to perform a predetermined operation on the data on the above-described data card. The predetermined operations may include but is not limited to: hovering operations of hovering the mouse pointer over the data on the data card, clicking operations of clicking on the data on the data card. If a predetermined operation on the data on the above-described data card is detected, the above-described execution actor may present a toolbar, which may be configured to adjust a style of the data on the above-described data card. The style of the data may include but is not limited to at least one of the following: a text font size of the data, a text font of the data, and a text background color of the data. The above-described toolbar may also include tools such as a format brush.

As shown in FIG. 7, FIG. 7 illustrates a schematic diagram of an application scenario of the method of field merging according to the present disclosure. In FIG. 7, an original table is shown as an icon 701, and the user merges the values of the three fields of name, gender, and residential address with the corresponding field data. The merged table is shown as an icon 702. If it is detected that the user hovers the mouse pointer over the merged field of the merged table 702, the data card may be presented as shown in an icon 703, and the data card 703 includes the values of the three fields of name, gender, and residential address and the corresponding field data.

Figures 8, 9:
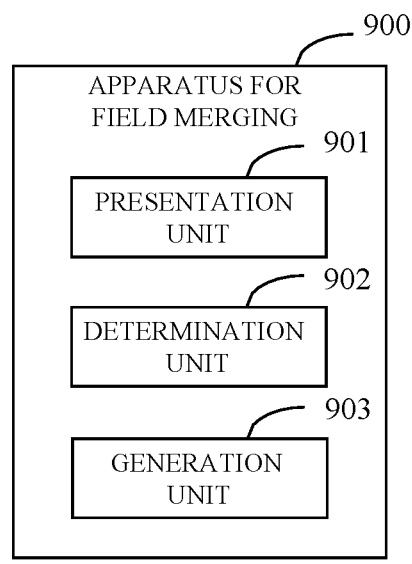
FIG. 8 is a schematic diagram of an application scenario for presenting a toolbar according to the method of field merging of the present disclosure.
FIG. 9 is a structural schematic diagram of an embodiment according to the apparatus for field merging of the present disclosure.

As shown in FIG. 8, FIG. 8 illustrates a schematic diagram of an application scenario of presenting a toolbar according to the method of field merging of the present disclosure. In FIG. 8, when the user hovers the mouse pointer over the data corresponding to the field "residential address", the toolbar indicated by an icon 801 may be presented. Here, in order from left to right, the toolbar 801 includes a format brush icon, an icon for adjusting font size, an icon for adjusting font, an icon for adjusting text background color, and other icons. Other icons may be configured according to business and are not limited here.

Users may use the tools in the presented toolbar to adjust the style of the data to make the card style of the data card more personalized. Referring further to FIG. 9, as an implementation of the methods shown in the above-described figures, the present application provides an embodiment of an apparatus for field merging, which corresponds to the method embodiment shown in FIG. 2 and may be specifically applied to various electronic devices.

As shown in FIG. 9, the apparatus for field merging 900 of the present embodiment includes: a presentation unit 901, a determination unit 902, and a generation unit 903. Herein, the presentation unit 901 is configured to in response to receiving a merging request for data columns in a table, present a field selection page containing header row fields of the data columns; the determination unit 902 is configured to determine at least two target header row fields from the header row fields on the field selection page; the generation unit 903 is configured to in response to receiving a merging instruction, generate a merged field in a header row of the table and generate merged data in a data column corresponding to the merged field.

In the present embodiment, the specific processing of the presentation unit 901, the determination unit 902 and the generation unit 903 of the apparatus for field merging 900 may refer to step 201, step 202 and step 203 in the embodiments corresponding to FIG. 2.

In some optional implementations, the above-described generation unit 903 is further configured to generate the merged field in the header row of the table in the following manner hiding the above-described target header row fields, and displaying the above-described merged field in a cell at an associated location of the above-described target header row fields.

In some optional implementations, the above-described generation unit 903 is further configured to generate the merged data in the data column corresponding to the above-described merged field in the following manner: hiding target data columns corresponding to the above-described target header row fields, and displaying the above-described merged data in a data column at an associated location of the above-described target data columns.

In some optional implementations, the above-described apparatus for field merging 900 may further include: a first display unit (not shown in the figure). The above-described first display unit is configured to in response to a viewing operation on the merged data in a target row of the table, display a data card comprising a collection of data in all cells corresponding to the target header row fields in the target row.

In some optional implementations, the above-described apparatus for field merging 900 may further include: a toolbar presentation unit (not shown in the figure). The above-described toolbar presentation unit is configured to in response to detecting a predetermined operation on the data on the above-described data card, present a toolbar configured to adjust a style of the data on the above-described data card.

In some optional implementations, the above-described apparatus for field merging 900 may further include: a second display unit (not shown in the figure). The above-described second display unit is configured to display a data card editing page comprising at least one of a field value, field data, field layout information, or a field style.

In some optional implementations, the above-described apparatus for field merging 900 may further include: a filling unit (not shown in the figure). The above-described filling unit is configured to in response to receiving the merging instruction and according to a predetermined rule, fill the determined target header row fields into the above-described field value, and/or fill the target data in target data columns corresponding to the above-described target header row fields into the above-described field data; generate the data card.

In some optional implementations, the above-described apparatus for field merging 900 may further include: a switching unit (not shown in the figure). The above-described switching unit is configured to in response to switching the above-described table from a first view to a second view, display the merged data in form of a data card in the above-described second view.

In some optional implementations, the above-described merged data is displayed as link information, and content of the above-described link information is a predetermined editing content.

In some optional implementations, a spatial range occupied by the above-described merged field in the above-described table is not greater than a spatial range occupied by any of the above-described target header row fields in the above-described table.

In some optional implementations, a spatial range occupied by a data column of the above-described merged data in the above-described table is not greater than a spatial range occupied by any target data column in the above-described table, wherein the above-described target data column is a data column corresponding to any of the above-described target header row fields. Below with reference to FIG. 10, which shows a schematic structural diagram of an electronic device 1000 suitable for implementing the embodiments of the present disclosure. The terminal device in the embodiments of the present disclosure may include, without limitation to, a mobile terminal such as a mobile phone, a laptop computer, a digital broadcast receiver, a PDA (personal digital assistant), a PAD (tablet computer), a PMP (portable multimedia player), an on-board terminal (e.g., on-board navigation terminal) and the like, as well as a fixed terminal such as a digital TV, a desktop computer and the like. The electronic device shown in FIG. 10 is merely an example and should not be construed to impose any limitations on the functionality and use scope of the embodiments of the present disclosure.

Figure 10:
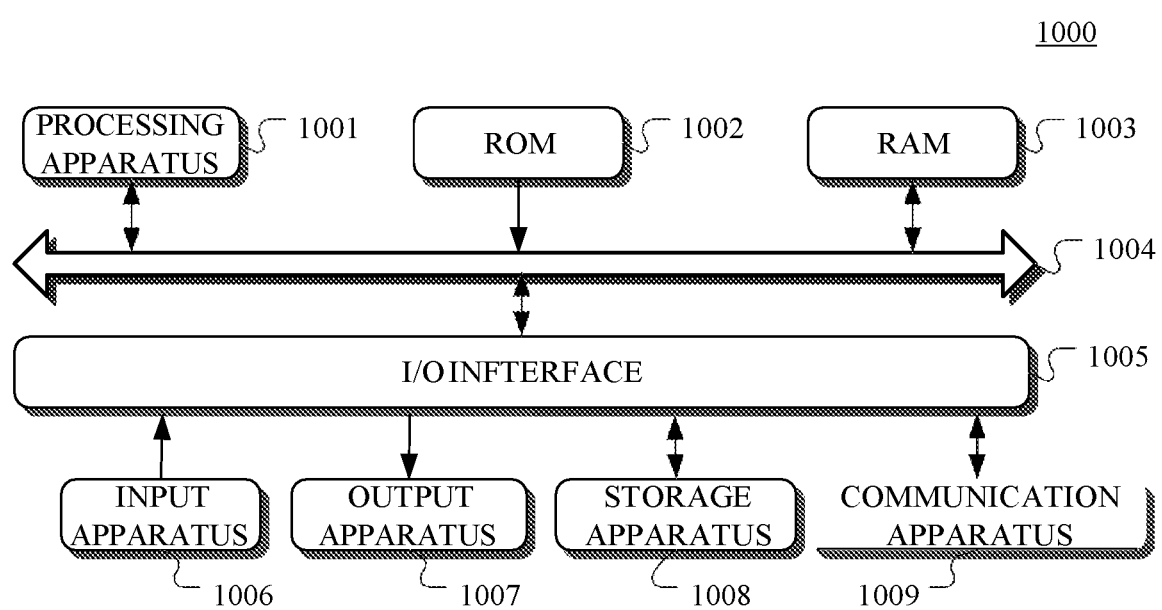
FIG. 10 is a structural schematic diagram of a computer system of the electronic device suitable for implementing the embodiments of the present disclosure.

As shown in FIG. 10, the electronic device may comprise processing apparatus (e.g., a central processor, a graphics processor) 1001 which is capable of performing various appropriate actions and processes in accordance with programs stored in a read only memory (ROM) 1002 or programs loaded from storage apparatus 1008 to a random access memory (RAM) 1003. In the RAM 1003, there are also stored various programs and data required by the electronic device 1000 when operating. The processing apparatus 1001, the ROM 1002 and the RAM 1003 are connected to one another via a bus 1004. An input/output (I/O) interface 1005 is also connected to the bus 1004.

Usually, the following means may be connected to the I/O interface 1005: input apparatus 1006 including a touch screen, a touch pad, a keyboard, a mouse, a camera, a microphone, an accelerometer, a gyroscope, or the like; output apparatus 1007, such as a liquid-crystal display (LCD), a loudspeaker, a vibrator, or the like; and communication apparatus 1009. The communication apparatus 1009 allows the electronic device 1000 to perform wireless or wired communication with other device so as to exchange data with another device. While FIG. 10 shows the electronic device 1000 with various means, it should be understood that it is not required to implement or have all of the illustrated means. Alternatively, more or less means may be implemented or exist. Each block shown in FIG. 10 may represent one apparatus or multiple apparatuses as needed.

Specifically, according to the embodiments of the present disclosure, the procedures described with reference to the flowchart may be implemented as computer software programs. For example, the embodiments of the present disclosure comprise a computer program product that comprises a computer program embodied on a non-transitory computer-readable medium, the computer program including program codes for executing the method shown in the flowchart. In such an embodiment, the computer program may be loaded and installed from a network via the communication apparatus 1009, or installed from the storage apparatus 1008, or installed from the ROM 1002. The computer program, when executed by the processing apparatus 1001, perform the above functions defined in the method of the embodiments of the present disclosure. It should be noted that the computer readable medium of the present disclosure can be a computer readable signal medium, a computer readable storage medium or any combination thereof. The computer readable storage medium may be, for example, but is not limited to, an electronic, magnetic, optical, electromagnetic, infrared or semiconductor system, apparatus or device, or any combination of the foregoing. More specific examples of the computer readable storage medium may include, without limitation to, the following: an electrical connection with one or more conductors, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer readable storage medium may be any tangible medium including or storing a program that may be used by or in conjunction with an instruction executing system, apparatus or device. In the present disclosure, the computer readable signal medium may include data signals propagated in the baseband or as part of the carrier waveform, in which computer readable program code is carried. Such propagated data signals may take a variety of forms, including without limitation to electromagnetic signals, optical signals, or any suitable combination of the foregoing. The computer readable signal medium may also be any computer readable medium other than a computer readable storage medium that may send, propagate, or transmit a program for use by, or in conjunction with, an instruction executing system, apparatus, or device. The program code contained on the computer readable medium may be transmitted by any suitable medium, including, but not limited to, a wire, a fiber optic cable, RF (radio frequency), etc., or any suitable combination thereof.

The above computer readable medium may be contained in the above electronic device; or it may exist separately and not be assembled into the electronic device. The above computer readable medium carries one or more programs which, when executed by the electronic device, cause the electronic device to: in response to receiving a merging request for data columns in a table, presenting a field selection page containing header row fields of the data columns; determining at least two target header row fields from the header row fields on the field selection page; and in response to receiving a merging instruction, generating a merged field in a header row of the table and generating merged data in a data column corresponding to the merged field. Computer program code for carrying out operations of the present disclosure may be written in one or more program designing languages or a combination thereof, which include without limitation to an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

According to one or more embodiments of the present disclosure, a method of field merging is provided. The method comprises: in response to receiving a merging request for data columns in a table, presenting a field selection page containing header row fields of the data columns; determining at least two target header row fields from the header row fields on the field selection page; and in response to receiving a merging instruction, generating a merged field in a header row of the table and generating merged data in a data column corresponding to the merged field.

According to one or more embodiments of the present disclosure, generating the merged field in the header row of the table comprises: hiding the target header row fields, and displaying the merged field in a cell at an associated location of the target header row fields.

According to one or more embodiments of the present disclosure, generating the merged data in the data column corresponding to the merged field comprises: hiding target data columns corresponding to the target header row fields, and displaying the merged data in a data column at an associated location of the target data columns.

According to one or more embodiments of the present disclosure, the method further comprises: in response to a viewing operation on the merged data in a target row of the table, displaying a data card comprising a collection of data in all cells corresponding to the target header row fields in the target row.

According to one or more embodiments of the present disclosure, after displaying the data card, the method further comprises: in response to detecting a predetermined operation on the data on the data card, presenting a toolbar configured to adjust a style of the data on the data card.

According to one or more embodiments of the present disclosure, before determining the at least two target header row fields from the header row fields on the field selection page, the method further comprises: displaying a data card editing page comprising at least one of a field value, field data, field layout information, or a field style.

According to one or more embodiments of the present disclosure, the method further comprises: in response to receiving the merging instruction and according to a predetermined rule, filling the determined target header row fields into the field value, and/or filling the target data in target data columns corresponding to the target header row fields into the field data; generating the data card.

According to one or more embodiments of the present disclosure, the method further comprises: in response to switching the table from a first view to a second view, displaying the merged data in form of a data card in the second view.

According to one or more embodiments of the present disclosure, the merged data is displayed as link information, content of the link information being a predetermined editing content.

According to one or more embodiments of the present disclosure, a spatial range occupied by the merged field in the table is not greater than a spatial range occupied by any of the target header row fields in the table.

According to one or more embodiments of the present disclosure, a spatial range occupied by a data column of the merged data in the table is not greater than a spatial range occupied by any target data column in the table, wherein the target data column is a data column corresponding to any of the target header row fields.

According to one or more embodiments of the present disclosure, an apparatus for field merging is provided. The apparatus comprises: a presentation unit for in response to receiving a merging request for data columns in a table, presenting a field selection page containing header row fields of the data columns; a determination unit for determining at least two target header row fields from the header row fields on the field selection page; and a generation unit for in response to receiving a merging instruction, generating a merged field in a header row of the table and generating merged data in a data column corresponding to the merged field.

According to one or more embodiments of the present disclosure, the generation unit is further configured to generate the merged field in the header row of the table in the following manner: hiding the target header row fields, and displaying the merged field in a cell at an associated location of the target header row fields.

According to one or more embodiments of the present disclosure, the generation unit is further configured to generate the merged data in the data column corresponding to the merged field in the following manner hiding target data columns corresponding to the target header row fields, and displaying the merged data in a data column at an associated location of the target data columns.

According to one or more embodiments of the present disclosure, the apparatus may further comprise: a first display unit for in response to a viewing operation on the merged data in a target row of the table, displaying a data card comprising a collection of data in all cells corresponding to the target header row fields in the target row.

According to one or more embodiments of the present disclosure, the apparatus may further comprise: a toolbar presentation unit for in response to detecting a predetermined operation on the data on the data card, presenting a toolbar configured to adjust a style of the data on the data card.

According to one or more embodiments of the present disclosure, the apparatus may further comprise: a second display unit for displaying a data card editing page comprising at least one of a field value, field data, field layout information, or a field style.

According to one or more embodiments of the present disclosure, the apparatus may further comprise: a filling unit for in response to receiving the merging instruction and according to a predetermined rule, filling the determined target header row fields into the field value, and/or filling the target data in target data columns corresponding to the target header row fields into the field data; generating the data card.

According to one or more embodiments of the present disclosure, the apparatus may further comprise: a switching unit for in response to switching the table from a first view to a second view, displaying the merged data in form of a data card in the second view.

According to one or more embodiments of the present disclosure, the merged data is displayed as link information, content of the link information being a predetermined editing content.

According to one or more embodiments of the present disclosure, a spatial range occupied by the merged field in the table is not greater than a spatial range occupied by any of the target header row fields in the table.

According to one or more embodiments of the present disclosure, a spatial range occupied by a data column of the merged data in the table is not greater than a spatial range occupied by any target data column in the table, wherein the target data column is a data column corresponding to any of the target header row fields.

The units described in the embodiments described in the present disclosure may be implemented by software or hardware. The described units may also be set in a processor, for example, as follows: a processor includes a presentation unit, a determination unit, and a generation unit. The names of these units do not limit the unit itself in some cases. For example, the determination unit may also be described as "a unit for determining at least two target header row fields from the header row fields on the field selection page".

The foregoing description is merely illustration of the preferred embodiments of the present disclosure and the technical principles used herein. Those skilled in the art should understand that the disclosure scope involved therein is not limited to the technical solutions formed from a particular combination of the above technical features, but should also cover other technical solutions formed by any combination of the above technical features or their equivalent features without departing from the above disclosure concepts, e.g., technical solutions formed by replacing the above features with technical features having similar functions disclosed (without limitation) in the present disclosure.

What is claimed is:

1. A method of field merging in a table, comprising:
   in response to receiving a merging request for data columns in the table, presenting, by a terminal device, a field selection page containing header row fields of the data columns;
   determining, by the terminal device and based on a selection operation from a user of the terminal device, at least two target header row fields from the header row fields on the field selection page; and
   in response to receiving a merging instruction, generating, by the terminal device, a merged field in a header row of the table and merged data in a data column corresponding to the merged field, wherein the merged field encapsulates field values of multiple fields to generate the merged data,
   wherein a display of the table is switchable, by the terminal device, between at least two views comprising a first view for displaying the table after merging and a second view for displaying the merged data in form of a chart and at least one data card displayed around the chart, wherein each of the at least one data card comprises the encapsulated field values corresponding to the merged data, the chart is generated using the merged data and comprises at least one chart element that is linked to the at least one data card via the merged data.

2. The method of claim 1, wherein generating the merged field in the header row of the table comprises:
   hiding the target header row fields, and displaying the merged field in a cell at an associated location of the target header row fields.

3. The method of claim 1, wherein generating the merged data in the data column corresponding to the merged field comprises:
   hiding target data columns corresponding to the target header row fields, and displaying the merged data in a data column at an associated location of the target data columns.

4. The method of claim 1, further comprising:
   in response to a viewing operation on the merged data in a target row of the table, displaying, by the terminal device, the data card comprising a collection of data in all cells corresponding to the target header row fields in the target row.

5. The method of claim 4, wherein, after displaying the data card, the method further comprises:
   in response to detecting a predetermined operation on the data on the data card, presenting, by the terminal device, a toolbar configured to adjust a style of the data on the data card.

6. The method of claim 1, wherein, before determining the at least two target header row fields from the header row fields on the field selection page, the method further comprises:
   displaying, by the terminal device, a data card editing page comprising at least one of a field value, field data, field layout information, or a field style.

7. The method of claim 6, further comprising:
   in response to receiving the merging instruction and according to a predetermined rule, filling, by the terminal device, the determined target header row fields into the field value, and/or filling, by the terminal device, the target data in target data columns corresponding to the target header row fields into the field data;
   generating, by the terminal device, the data card.

8. The method of claim 1, further comprising:
in response to switching the table from the first view to the second view, displaying the merged data in form of the data card in the second view.

9. The method of claim 1, wherein the merged data is displayed as link information, content of the link information being a predetermined editing content.

10. The method of claim 1, wherein a spatial range occupied by the merged field in the table is not greater than a spatial range occupied by any of the target header row fields in the table.

11. The method of claim 1, wherein a spatial range occupied by a data column of the merged data in the table is not greater than a spatial range occupied by any target data column in the table, wherein the target data column is a data column corresponding to any of the target header row fields.

12. An electronic device, comprising:
one or more processors;
a storage apparatus having one or more programs stored thereon;
when the one or more programs are performed by the one or more processors, causing the one or more processors to implement acts of field merging, the acts comprising:
in response to receiving a merging request for data columns in a table, presenting a field selection page containing header row fields of the data columns;
determining, based on a selection operation from a user of the electronic device, at least two target header row fields from the header row fields on the field selection page; and
in response to receiving a merging instruction, generating a merged field in a header row of the table and merged data in a data column corresponding to the merged field, wherein the merged field encapsulates field values of multiple fields to generate the merged data,
wherein a display of the table is switchable, by a terminal device, between at least two views comprising a first view for displaying the table after merging and a second view for displaying the merged data in form of a chart and at least one data card displayed around the chart, wherein each of the at least one data card comprises the encapsulated field values corresponding to the merged data, the chart is generated using the merged data and comprises at least one chart element that is linked to the at least one data card via the merged data.

13. The electronic device of claim 12, wherein generating the merged field in the header row of the table comprises:
hiding the target header row fields, and displaying the merged field in a cell at an associated location of the target header row fields.

14. The electronic device of claim 12, wherein generating the merged data in the data column corresponding to the merged field comprises:
hiding target data columns corresponding to the target header row fields, and displaying the merged data in a data column at an associated location of the target data columns.

15. The electronic device of claim 12, the acts further comprising:
in response to a viewing operation on the merged data in a target row of the table, displaying the data card comprising a collection of data in all cells corresponding to the target header row fields in the target row.

16. The electronic device of claim 12, wherein, before determining the at least two target header row fields from the header row fields on the field selection page, the acts further comprises:
displaying a data card editing page comprising at least one of a field value, field data, field layout information, or a field style.

17. The electronic device of claim 12, the acts further comprising:
in response to switching the table from the first view to the second view, displaying the merged data in form of the data card in the second view.

18. The electronic device of claim 12, wherein the merged data is displayed as link information, content of the link information being a predetermined editing content.

19. The electronic device of claim 12, wherein a spatial range occupied by the merged field in the table is not greater than a spatial range occupied by any of the target header row fields in the table.

20. A computer non-transitory readable medium with a computer program stored thereon, wherein the program implements acts of field merging in a table, the acts comprising:
in response to receiving a merging request for data columns in the table, presenting, by a terminal device, a field selection page containing header row fields of the data columns;
determining, based on a selection operation from a user of the terminal device, at least two target header row fields from the header row fields on the field selection page; and
in response to receiving a merging instruction, generating, by the terminal device, a merged field in a header row of the table and merged data in a data column corresponding to the merged field, wherein the merged field encapsulates field values of multiple fields to generate the merged data,
wherein a display of the table is switchable, by the terminal device, between at least two views comprising a first view for displaying the table after merging and a second view for displaying the merged data in form of a chart and at least one data card displayed around the chart, wherein each of the at least one data card comprises the encapsulated field values corresponding to the merged data, the chart is generated using the merged data and comprises at least one chart element that is linked to the at least one data card via the merged data.

* * * * *